United States Patent [19]

Kaneko

[11] Patent Number: 5,503,106
[45] Date of Patent: Apr. 2, 1996

[54] APPARATUS FOR COLLECTING DEVELOPER CARRIER IN A ELECTROPHOTOGRAPHIC MACHINE

[75] Inventor: Shintaro Kaneko, Kanagawa, Japan

[73] Assignee: Fuji Xerox Co., Ltd., Tokyo, Japan

[21] Appl. No.: 417,684

[22] Filed: Apr. 6, 1995

[30] Foreign Application Priority Data

May 16, 1994 [JP] Japan .................... 6-101143

[51] Int. Cl.$^6$ .................................. G03G 15/08
[52] U.S. Cl. ...................... 118/652; 355/269; 355/305
[58] Field of Search .................... 355/298, 269, 355/305; 118/652

[56] References Cited

U.S. PATENT DOCUMENTS

| | | | |
|---|---|---|---|
| 4,829,338 | 5/1989 | Whittaker et al. | 355/305 |
| 5,283,617 | 2/1994 | Benedict et al. | 355/253 |
| 5,404,215 | 4/1995 | Bares | 118/652 |

FOREIGN PATENT DOCUMENTS

53-32599  8/1978  Japan.
62-262074  11/1987  Japan.

Primary Examiner—Joan H. Pendegrass
Assistant Examiner—Quana Grainger
Attorney, Agent, or Firm—Finnegan, Henderson, Farabow, Garrett & Dunner

[57] ABSTRACT

In an image forming apparatus such as an electrophotographic copying machine or an electrophotographic printer, for performing development by using a two-component developer, a carrier collecting device for collecting a carrier deposited on a photosensitive member in development is provided. The carrier collecting device includes a fixed magnet disposed in such a manner that an intermediate position between an S pole and an N pole of the fixed magnet is closest to the photosensitive member. Accordingly, the carrier can be effectively collected from the photosensitive member, and the carrier captured to the fixed magnet can be prevented from rubbing against the photosensitive member.

8 Claims, 5 Drawing Sheets

APPARATUS FOR COLLECTING DEVELOPER CARRIER IN A ELECTROPHOTOGRAPHIC MACHINE

BACKGROUND OF THE INVENTION

1. Field of the Invention

The present invention relates to a carrier collecting device for collecting a carrier deposited on a photosensitive member in development for use in an image forming apparatus such as an electrophotographic copying machine or an electrophotographic printer for performing development by using a two-component developer.

2. Description of the Related Art

In an image forming apparatus such as an electrophotographic copying machine or an electrophotographic printer, a two-component developer having a toner and a carrier is conventionally widely used in performing development. A developing unit using such a two-component developer is so designed as to deposit only the toner onto a photosensitive member and recover the carrier not deposited onto the photosensitive member. However, the carrier is not completely recovered but some of the carrier is deposited onto the photosensitive member. If the carrier is deposited onto the photosensitive member, the toner present in the periphery of the carrier on the photosensitive member cannot enough come into contact with a transfer paper, causing the generation of white spots or the like.

To prevent this defect, there has conventionally been proposed a device for collecting the carrier deposited onto the photosensitive member. For example, there is proposed in Japanese Patent Laid-open No. Sho 62-262074 a device for collecting the carrier by forming an electric field between a collecting member and a photosensitive member. Further, there is proposed in Japanese Utility Model Publication No. Sho 53-32599 a device for collecting the carrier by a magnetic attraction force.

In recent years, a copying machine or a printer using electrophotography has a tendency that a gap between a photosensitive member and a developing roller is reduced to perform development with a strong development field in order to prevent a line of electric force from turning about from an edge portion of an image formed on the photosensitive member to a nonimage portion, thereby suppressing an edge effect, from the viewpoint of improvement in image quality such as reproducibility of a solid portion having a uniform density or reproducibility of a fine line. Further, while a magnetic brush composed of carrier and toner is formed in development, it is necessary to reduce a scavenging force (a force of scavenging the photosensitive member) by the magnetic brush from the viewpoint of eliminating scavenging lines generated at the solid portion by the magnetic brush to perform uniform development. To meet this requirement, there is a tendency to use a spherical carrier having a small particle size of 50 μm, for example, as compared with a conventional carrier having a particle size of 100 μm.

The combination of such a strong development field and a small-sized carrier can provide a high-quality image. However, a magnetic deposition force of the small-sized carrier is extremely smaller than that of the conventional carrier having a particle size of about 100 μm, and the strong development field has an adverse effect to cause a problem that the small-sized carrier is easily deposited to a nonimage portion of the photosensitive member by an electric field. As mentioned above, if the carrier is deposited onto the photosensitive member, the toner present in the periphery of the carrier on the photosensitive member cannot enough come into contact with a paper in a transfer step, causing transfer defect to remarkably reduce the image quality.

As mentioned above, various devices for collecting the carrier deposited onto the photosensitive member have conventionally been proposed. To collect the small-sized carrier deposited onto the photosensitive member, it is necessary to apply a magnetic field or an electric field stronger than that in the case of collecting the conventional large-sized carrier. The magnetic field or the electric field can be enhanced by locating the collecting device near the photosensitive member. However, mere location of the collecting device near the photosensitive member causes a problem that the carrier collected by the collecting device may rub against an image portion of the photosensitive member during feeding the carrier to generate while lines.

SUMMARY OF THE INVENTION

It is accordingly an object of the present invention to provide a carrier collecting device which can effectively collect a carrier from a photosensitive member and prevent the carrier collected from rubbing against the photosensitive member.

According to a first aspect of the present invention, there is provided in an image forming apparatus for forming a latent image on a photosensitive member, developing the latent image by using a two-component developer having a carrier and a toner, and transferring a developed image; a carrier collecting device for collecting the carrier deposited on the photosensitive member in development of the latent image, the carrier collecting device comprising a fixed magnet having two poles different in polarity, the fixed magnet being disposed so that a peak position of a tangential magnetic force between the two poles is closer to the photosensitive member than any one of peak positions of normal magnetic forces over the two poles.

According to a second aspect of the present invention, there is provided in an image forming apparatus for forming a latent image on a photosensitive member, developing the latent image by using a two-component developer having a carrier and a toner, and transferring a developed image; a carrier collecting device for collecting the carrier deposited on the photosensitive member in development of the latent image, the carrier collecting device comprising a fixed magnet having two poles different in polarity, the fixed magnet forming between the two poles a region having a tangential magnetic force greater in value than any one of maximal values of normal magnetic forces over the two poles, the fixed magnet being disposed so that any position in the region is closest to the photosensitive member.

Preferably, in the carrier collecting device according to the first aspect or the second aspect of the present invention, the fixed magnet comprises a columnar fixed magnet having a plurality of poles arranged in a circumferential direction of the magnet, the columnar fixed magnet extending along the photosensitive member; the carrier collecting device further comprising a cylindrical capture sleeve located close to the photosensitive member for capturing the carrier deposited on the photosensitive member, the capture sleeve surrounding the fixed magnet and being adapted to rotate along a circumference of the fixed magnet; a scraper for scraping off the carrier captured by the capture sleeve from the capture sleeve, the scraper being located downstream of a position of the capture sleeve closest to the photosensitive member in respect of a direction of rotation of the capture sleeve, the scraper being kept in contact with or close to the capture sleeve; and a storing case for storing the carrier scraped off by the scraper.

The carrier captured by the magnetic force of the fixed magnet forms a carrier chain along a line of magnetic force. Further, a carrier cluster (magnetic brush) is formed over an S pole or an N pole.

Conventionally, the S pole or the N pole of the fixed magnet is usually located closest to the photosensitive member. To the contrary, the carrier collecting device according to the first aspect or the second aspect of the present invention is characterized in that a substantially intermediate position between the S pole and the N pole of the fixed magnet is closest to the photosensitive member.

In the carrier collecting device according to the first aspect of the present invention, the substantially intermediate position between the S pole and the N pole closest to the photosensitive member is defined as a geometrical fixed position of the fixed magnet determined from peak positions of normal and tangential magnetic forces of the fixed magnet. In the carrier collecting device according to the second aspect of the present invention, the substantially intermediate position between the S pole and the N pole closest to the photosensitive member is defined as a geometrical fixed position of the fixed magnet determined by using a region present between the S pole and the N pole, the region having a tangential magnetic force greater in value than any one of maximal values of normal magnetic forces over the S pole and the N pole.

Thus, in the carrier collecting device according to the first aspect or the second aspect of the present invention, the substantially intermediate position between the S pole and the N pole of the fixed magnet is closest to the photosensitive member. Therefore, the carrier chain is formed in the tangential direction with respect to the photosensitive member, and the magnetic brush is formed at a position remote from the photosensitive member, so that the carrier captured hardly comes into contact with the photosensitive member. Accordingly, a high-quality image can be obtained as compared with the related art. Otherwise, if the possibility of contact is allowed to the same degree as that in the related art, the fixed magnet may be disposed closer to the photosensitive member by the corresponding distance, thereby generating a stronger magnetic field to increase a carrier capturing force.

Further, since the portion of the fixed magnet closest to the photosensitive member is positioned substantially intermediately between the S pole and the N pole, a carrier feeding force at this closest portion is stronger than that at the other portion over the S pole or the N pole. Accordingly, the carrier captured can be moved away from the photosensitive member more easily and quickly.

Further, the stronger the magnetic force over the S pole or the N pole of the fixed magnet, the more advantageous. Therefore, the S pole or the N pole is magnetized so as to generate a maximum magnetic force determined from the material, size, etc. of the fixed magnet, and it is usually difficult to obtain a magnetic force greater than the maximum magnetic force. In the present invention, however, even when the normal magnetic force over the S pole or the N pole is the same as that in the related art, the tangential magnetic force at the intermediate portion between the S pole and the N pole, i.e., at the portion closest to the photosensitive member, can be made stronger than the normal magnetic force over the S pole or the N pole by reducing the distance between the S pole and the N pole, because the substantially intermediate portion between the S pole and the N pole is closest to the photosensitive member. Accordingly, even when the distance between the fixed magnet and the photosensitive member is the same as that in the related art, the carrier deposited on the photosensitive member can be captured by a stronger force by adopting such a fixed magnet having the reduced distance between the S pole and the N pole.

As described above, the carrier collecting device of the present invention is characterized in that the substantially intermediate position between the S pole and the N pole of the fixed magnet is closest to the photosensitive member. Accordingly, the carrier captured forms a carrier chain in the tangential direction in the vicinity of the photosensitive member, thus reducing the possibility of the carrier rubbing against the photosensitive member. Furthermore, since the portion closest to the photosensitive member has a great carrier feeding force, the carrier captured can be fed to the position of the scraper easily and quickly by the rotation of the capture sleeve.

Accordingly, the image forming apparatus employing the carrier collecting device of the present invention can provide a high-quality image with white spots and white lines reduced.

Other objects and features of the invention will be more fully understood from the following detailed description and appended claims when taken with the accompanying drawings.

DETAILED DESCRIPTION OF THE PREFERRED EMBODIMENTS

Figure 1:
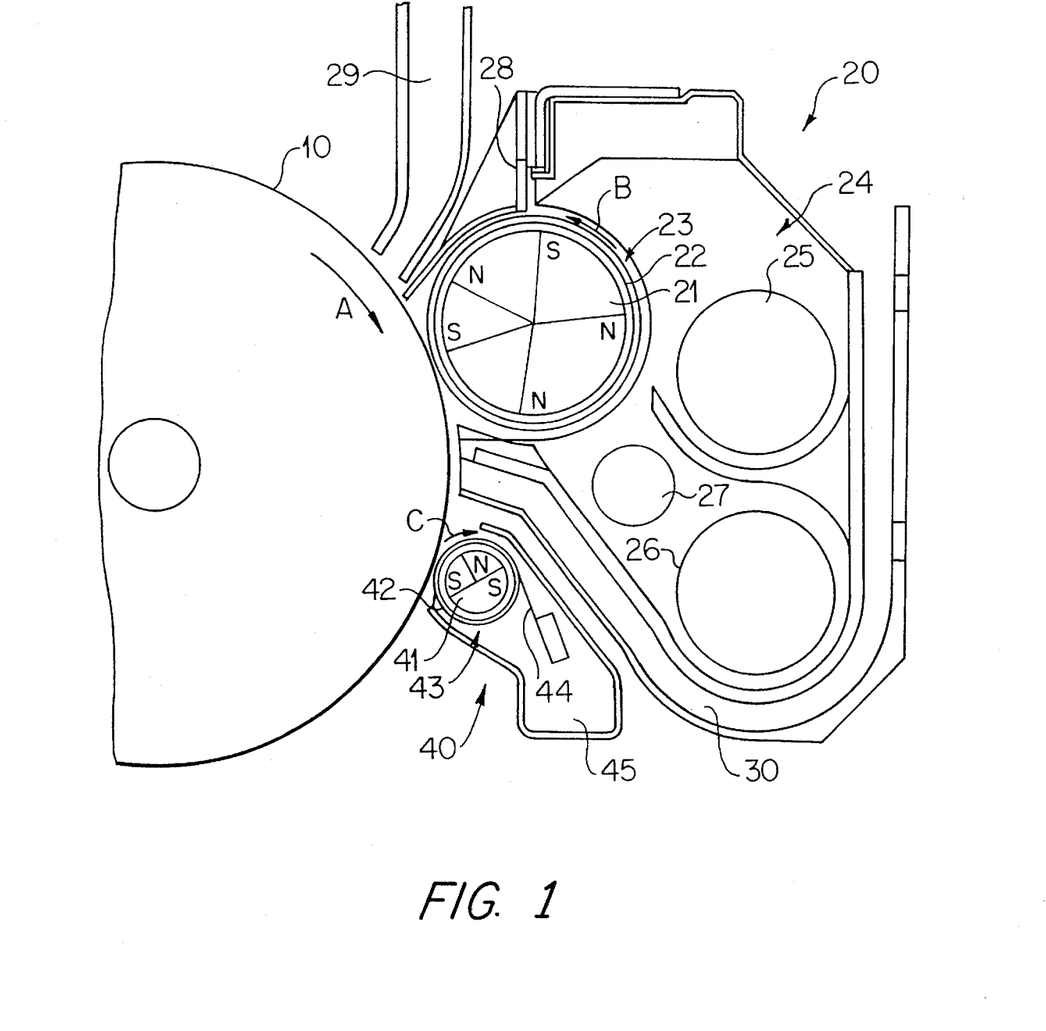
FIG. 1 is a view showing the structure of a developing section and its peripheral portion in an image forming apparatus employing a preferred embodiment of the carrier collecting device of the present invention.

Referring to FIG. 1, reference numeral 10 denotes a photosensitive drum rotatably provided in an image forming apparatus.

A developing device 20 is located close to the photosensitive drum 10. The developing device 20 is provided with a developing roller 23 composed of a columnar fixed magnet 21 extending in a direction perpendicular to the plane of the sheet of FIG. 1 and a cylindrical sleeve 22 surrounding the fixed magnet 21. A two-component developer (not shown) composed of carrier and toner is stored in a developer tank 24. The developer is agitated by an upper auger 25, a lower auger 26, and a counter auger 27. The toner attached to the carrier by the agitation is attracted together to the fixed magnet 21 and is deposited to the sleeve 22. The sleeve 22 is rotated in a direction of arrow B. The developer deposited to the sleeve 22 is restricted in its layer thickness by a layer thickness restricting member 28 during the rotation of the sleeve 22. Thereafter, the developer on the sleeve 22 is fed to a position close to the photosensitive drum 10 by the rotation of the sleeve 22. On the other hand, the photosensitive drum 10 is rotated in a direction of arrow A. A latent image formed on the photosensitive drum 10 at its upstream portion is developed by the toner of the developer on the sleeve 22. The toner splashed in the development is recovered through ducts 29 and 30 kept under vacuum. The carrier after the development is kept deposited on the sleeve 22 and is returned to the developer tank 24. In the development, some of the carrier is deposited to the photosensitive drum 10. To collect this carrier from the photosensitive drum 10, a carrier collecting device 40 is located on the downstream side of the developing device 20.

The carrier collecting device 40 is provided with a capture roller 43 composed of a columnar fixed magnet 41 and a capture sleeve 42 surrounding the fixed magnet 41 and adapted to rotate in a direction of arrow C. The fixed magnet 41 is disposed so that an intermediate position between an upstream S pole and an N pole is closest to the photosensitive drum 10.

The carrier deposited on the photosensitive drum 10 and fed to a position opposed to the fixed magnet 41 is attracted by the fixed magnet 41 and is deposited to the capture sleeve 42. Then, the carrier deposited to the capture sleeve 42 is fed in the direction C. A scraper 44 for scraping off the carrier fed by the capture sleeve 42 is located at a position just over a downstream S pole of the fixed magnet 41 with respect to the direction of rotation (the direction C) of the capture sleeve 42 in such a manner as to be in contact with or close to the capture sleeve 42. The carrier scraped off by the scraper 44 is stored into a storing case 45.

Figure 2A:
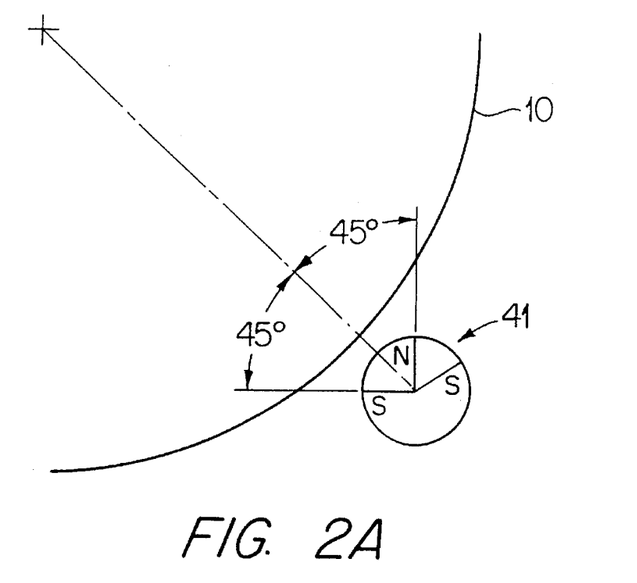
FIG. 2A is a schematic view showing the arrangement of a fixed magnet provided in the carrier collecting device according to the preferred embodiment.
Figure 2B:
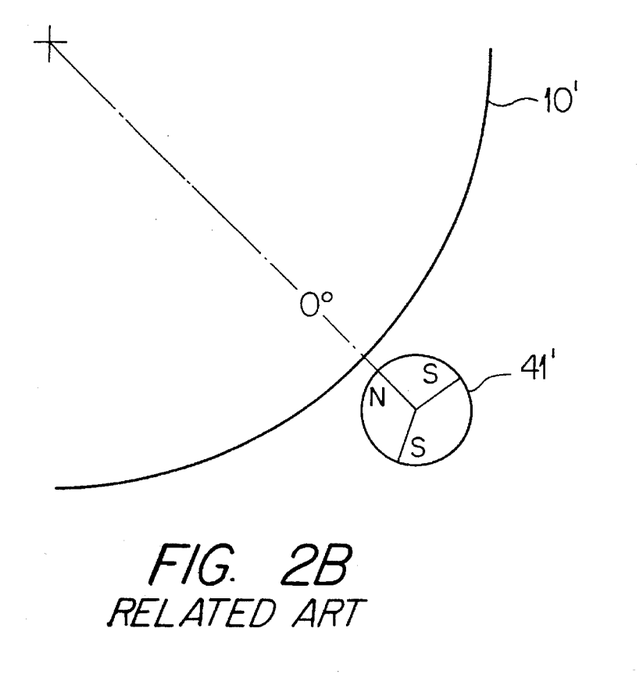
FIG. 2B is a view similar to FIG. 2A, showing the arrangement of a fixed magnet in the related art.

FIG. 2A schematically shows the arrangement of the fixed magnet 41 provided in the carrier collecting device 40 in this preferred embodiment, whereas FIG. 2B schematically shows the arrangement of a fixed magnet 41' in the related art for the purpose of comparison with the arrangement shown in FIG. 2A.

As shown in FIG. 2A, the fixed magnet 41 in this preferred embodiment is fixedly disposed so that the intermediate position between the upstream S pole and the N pole is closest to the photosensitive drum 10. In contrast, the related art shown in FIG. 2B uses a strong normal magnetic force in the vicinity of a pole (an N pole in this case) of the fixed magnet 41', and accordingly the pole is closest to a photosensitive drum 10'.

Figure 3:
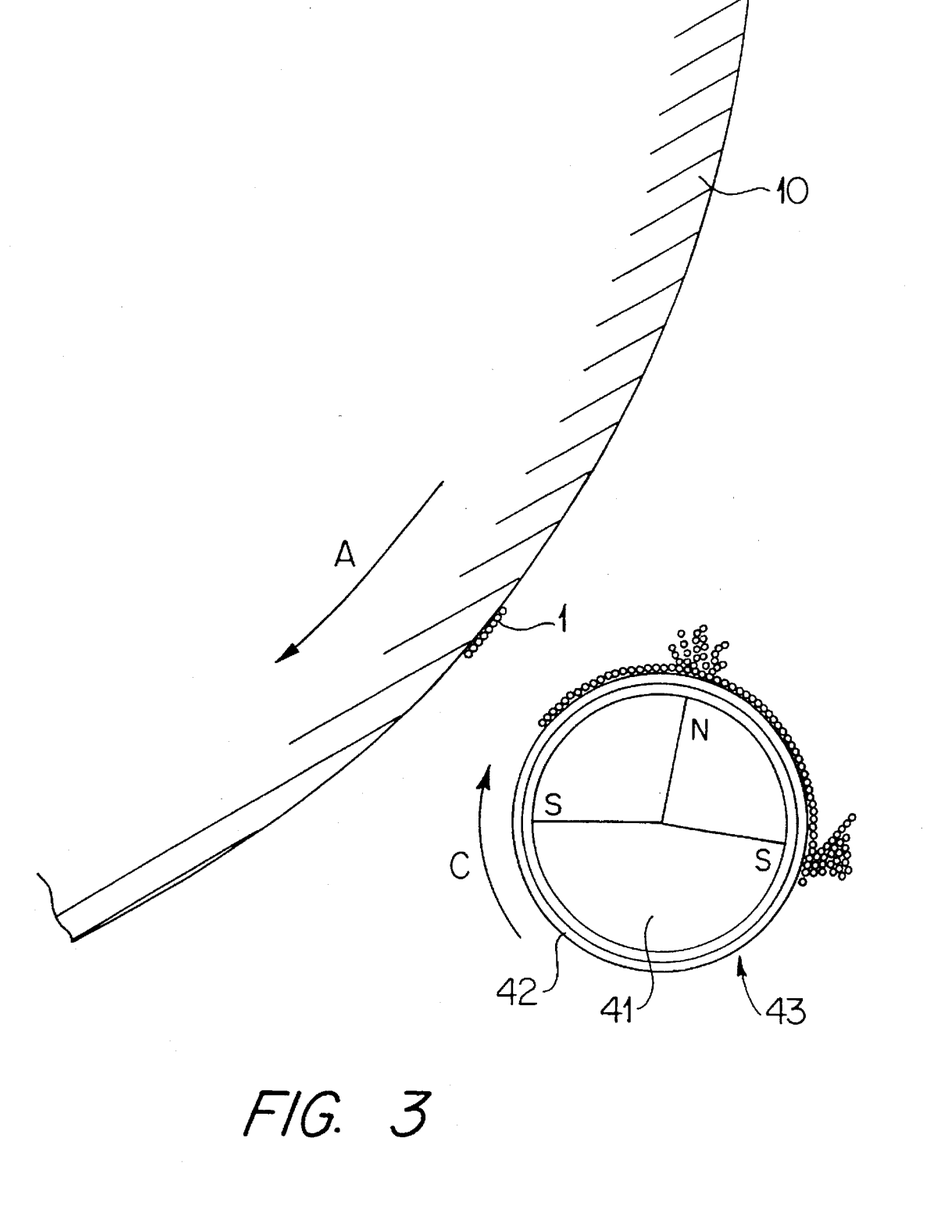
FIG. 3 is a schematic view showing a manner that a carrier deposited on a photosensitive member is captured by a capture sleeve.

FIG. 3 schematically shows such a manner that the carrier at 1 deposited on the photosensitive drum 10 is captured by the capture roller 43.

As shown in FIG. 3, the carrier 1 deposited on the photosensitive drum 10 is magnetically attracted by the fixed magnet 41 constituting the capture roller 43. The carrier 1 attracted by the fixed magnet 41 forms a carrier chain such that many carrier particles are chained along a line of magnetic force. As the line of magnetic force extends tangentially between each S pole and the N pole, the carrier chain is also formed in such a direction as to be closely deposited on the capture sleeve 42. Accordingly, the possibility that the carrier 1 captured by the capture sleeve 42 may come into contact with the photosensitive drum 10 can be reduced. Further, the carrier is fed by the rotation of the capture sleeve 42 more easily between each S pole and the N pole than over each pole. Accordingly, the carrier captured by the capture sleeve 42 fast moves away from the photosensitive drum 10 in this preferred embodiment employing the arrangement of the fixed magnet 41 such that the intermediate position between the upstream S pole and the N pole is closest to the photosensitive drum 10. The line of magnetic force over each pole of the fixed magnet 41 extends normally, so that a carrier cluster (magnetic brush) is formed over each pole. However, since each pole of the fixed magnet 41 is positioned remote from the photosensitive drum 10, the possibility that the magnetic brush may rub against the photosensitive drum 10 can also be reduced.

In this manner, the generation of white lines due to rubbing of the carrier against an image region on the photosensitive drum 10 can be avoided and the carrier can be effectively collected according to this preferred embodiment.

Figure 4:
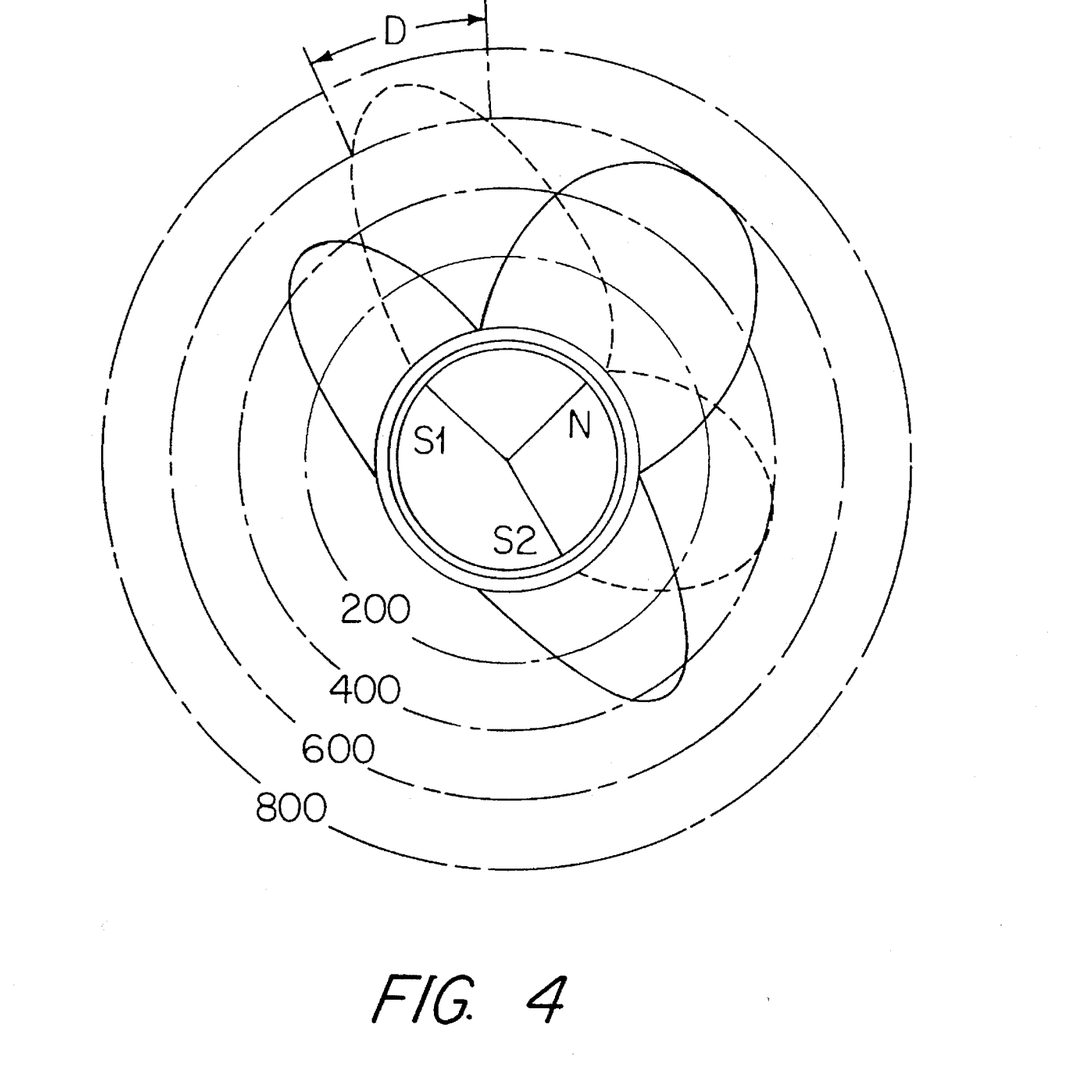
FIG. 4 is a view showing measured values of magnetic forces of the fixed magnet.

FIG. 4 shows measured values of magnetic forces of the fixed magnet, wherein the distribution of normal magnetic force is shown by a solid line, and the distribution of tangential magnetic force is shown by a broken line.

As shown in FIG. 4, the normal magnetic force is strong over each pole, and the tangential magnetic force is strong between poles. Further, the distance between the upstream S pole (S1 pole) and the N pole is smaller than the distance between the N pole and the downstream S pole (S2 pole). In the fixed magnet with the smaller distance between the upstream S pole and the N pole, there is formed therebetween a region D having a magnetic force (tangential magnetic force) stronger than the magnetic force over each pole (normal magnetic force). Accordingly, by disposing the fixed magnet in such a manner that any position in the region D (typically, a peak position of the tangential magnetic force) is closest to the photosensitive drum 10, the carrier deposited on the photosensitive drum 10 can be more effectively captured by a magnetic force stronger than that in the case where a pole position is closest to the photosensitive drum 10, in addition to the above-mentioned advantages that the carrier chain is tangentially formed between poles to thereby reduce the possibility of the carrier rubbing against the photosensitive drum 10 and that the feedability of the carrier is high between poles.

Figure 5:
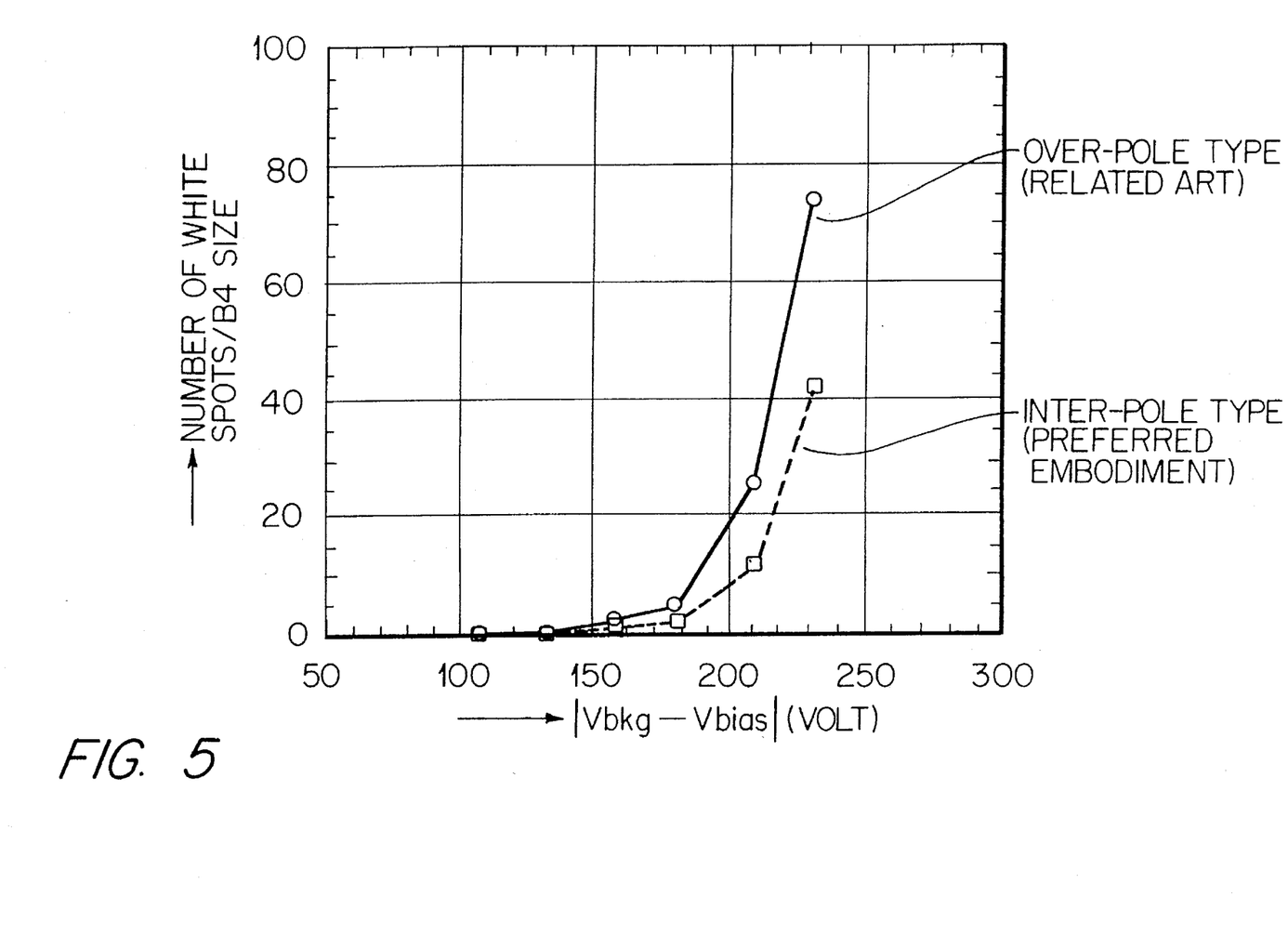
FIG. 5 is a graph showing test data in which the number of white spots is compared between the preferred embodiment and the related art.

FIG. 5 shows test data in which the number of white spots is compared between the preferred embodiment and the related art. In this test, a magnet having the magnetic force distribution shown in FIG. 4 was used, and the magnet was fixed in such a manner that the intermediate position between the S1 pole and the N pole was closest to the photosensitive drum as shown in FIG. 2A and that the N pole was closest to the photosensitive drum as shown in FIG. 2B. In FIG. 5, the preferred embodiment (interpole type) is shown by a broken line, and the related art (over-pole type) is shown by a solid line.

The distance between the photosensitive drum 10 and the capture sleeve 42 (see FIG. 1) was 0.48 mm at one axial end, 0.49 mm at the axial center, and 0.48 mm at the other axial end in both the interpole type (the preferred embodiment) and the over-pole type (the related art) as the results of measurement. In a development step for magenta with use of a color printer, a potential difference $|V_{bkg}-V_{bias}|$ between a charge potential $V_{bkg}$ as a background of the photosensitive drum 10 and a bias potential $V_{bias}$ applied to the developing roller 23 was changed. After the development of magenta, a half-tone image having a cyan image density of 20% was developed to obtain a visible image. In this visible image, the number of white spots per B4 size was measured.

As shown in FIG. 5, the result of measurement showed that the number of white spots in the interpole type (the preferred embodiment) wherein the intermediate position between the S1 pole and the N pole was closest to the photosensitive drum was reduced to substantially half the number of white spots in the over-pole type (the related art) wherein the N pole was closest to the photosensitive drum.

In addition to the evaluation shown in FIG. 5, the frequency of occurrence of white lines was also evaluated. As the result, it was confirmed that the frequency of occurrence of white lines in the preferred embodiment was greatly reduced as compared with that in the related art.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In an image forming apparatus for forming a latent image on a photosensitive member, developing said latent image by using a two-component developer having a carrier and a toner, and transferring a developed image; a carrier collecting device for collecting said carrier deposited on said photosensitive member in development of said latent image, said carrier collecting device comprising a fixed magnet having two poles different in polarity, said fixed magnet being disposed so that the line of magnetic force of each of said two poles extends in a direction away from a point on the photosensitive member closest to the fixed magnet.

2. A carrier collecting device according to claim 1, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept in contact with said capture sleeve; and a storing case for storing said carrier scraped off by said scraper.

3. A carrier collecting device according to claim 1, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept close to said capture sleeve; and a storing case for storing said carrier scraped off by said scraper.

4. In an image forming apparatus for forming a latent image on a photosensitive member, developing said latent image by using a two-component developer having a carrier and a toner, and transferring a developed image; a carrier collecting device for collecting said carrier deposited on said photosensitive member in development of said latent image, said carrier collecting device comprising a fixed magnet having two poles different in polarity and substantially perpendicular to one another, said fixed magnet being closest to said photosensitive member at a position intermediate said two poles so that carrier collected at each of said poles does not contact said photosensitive member.

5. A carrier collecting device according to claim 4, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept in contact with said capture sleeve; and a storing case for storing said carrier scraped off by said scraper.

6. A carrier collecting device according to claim 4, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept close to said capture sleeve; and a storing case for storing said carrier scraped off by said scraper.

7. In an image forming apparatus for forming a latent image on a photosensitive member, developing said latent image by using a two-component developer having a carrier and a toner, and transferring a developed image; a carrier collecting device for collecting said carrier deposited on said photosensitive member in development of said latent image, said carrier collecting device comprising a fixed magnet having two poles different in polarity, said fixed magnet being disposed so that a peak position of a tangential magnetic force between said two poles is closer to said photosensitive member than any one of peak positions of normal magnetic forces over said two poles, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept close to said capture sleeve; and a storing case for storing said carrier scraped off by said scraper.

8. In an image forming apparatus for forming a latent image on a photosensitive member, developing said latent image by using a two-component developer having a carrier and a toner, and transferring a developed image; a carrier collecting device for collecting said carrier deposited on said photosensitive member in development of said latent image, said carrier collecting device comprising a fixed magnet having two poles different in polarity, said fixed magnet forming between said two poles a region having a tangential magnetic force greater in value than any one of maximal values of normal magnetic forces over said two poles, said fixed magnet being disposed so that any position in said region is closest to said photosensitive member, wherein said fixed magnet comprises a columnar fixed magnet having a plurality of poles arranged in a circumferential direction of said magnet, said columnar fixed magnet extending along said photosensitive member; said carrier collecting device further comprising:

a cylindrical capture sleeve located close to said photosensitive member for capturing said carrier deposited on said photosensitive member, said capture sleeve surrounding said fixed magnet and being adapted to rotate along a circumference of said fixed magnet;

a scraper for scraping off said carrier captured by said capture sleeve from said capture sleeve, said scraper being located downstream of a position of said capture sleeve closest to said photosensitive member in respect of a direction of rotation of said capture sleeve, said scraper being kept close to said capture sleeve; and a storing case for storing said carrier scraped off by said scraper.

* * * * *